(12) United States Patent
Varsell et al.

(10) Patent No.: US 7,024,787 B2
(45) Date of Patent: Apr. 11, 2006

(54) TEMPLATE FOR EVALUATING PARTS AND METHOD OF USING SAME

(75) Inventors: Richard W. Varsell, Bristol, CT (US); Jesse R. Boyer, Berlin, CT (US); Dorel M. Moisei, West Hartford, CT (US); James M. Koonankeil, Marlborough, CT (US); Lukas A. Rubino, Baltimore, MD (US)

(73) Assignee: United Technologies Corporation, Hartford, CT (US)

( * ) Notice: Subject to any disclaimer, the term of this patent is extended or adjusted under 35 U.S.C. 154(b) by 0 days.

(21) Appl. No.: 10/898,694

(22) Filed: Jul. 23, 2004

(65) Prior Publication Data

US 2005/0217131 A1    Oct. 6, 2005

Related U.S. Application Data

(60) Provisional application No. 60/558,650, filed on Apr. 1, 2004.

(51) Int. Cl.
*G01B 3/14* (2006.01)

(52) U.S. Cl. .......................................... 33/562; 33/547

(58) Field of Classification Search ............ 33/501.05, 33/545–547, 561.1, 562; 73/865
See application file for complete search history.

(56) References Cited

U.S. PATENT DOCUMENTS

| | | | | |
|---|---|---|---|---|
| 4,578,875 | A | * | 4/1986 | Vertin .......................... 33/562 |
| 4,812,052 | A | * | 3/1989 | Adam et al. ................. 73/760 |
| 5,065,518 | A | * | 11/1991 | Herrera ....................... 33/547 |
| 5,181,325 | A | * | 1/1993 | Damon ........................ 33/562 |
| 5,181,809 | A | * | 1/1993 | Martin ........................ 33/562 |
| 5,186,190 | A | * | 2/1993 | Hirzel ........................ 132/319 |
| 5,390,422 | A | * | 2/1995 | Hill ............................. 33/562 |
| 5,666,737 | A | * | 9/1997 | Ryan, III ..................... 33/562 |
| 5,787,598 | A | * | 8/1998 | Tillis et al. ................... 33/562 |
| 6,332,275 | B1 | * | 12/2001 | Tsai et al. .................... 33/547 |
| 6,571,484 | B1 | | 6/2003 | Hastilow |
| 6,796,051 | B1 | * | 9/2004 | Trice et al. .................. 33/562 |
| 2003/0188675 | A1 | * | 10/2003 | Valeriote et al. ............ 112/117 |
| 2004/0148793 | A1 | * | 8/2004 | Holder ......................... 33/562 |

* cited by examiner

*Primary Examiner*—G. Bradley Bennett
(74) *Attorney, Agent, or Firm*—Brian J. Hamilla; Colin L. Cini

(57) ABSTRACT

A template for evaluating a part, comprising: a surface having a shape corresponding to the part; and at least one element on the surface corresponding to a desired location of a feature on the part. A method of evaluating a part, comprising the steps of: providing a template having a shape corresponding to the part and at least one element thereon corresponding to a desired location on the part; associating the template with the part; and using the element to determine whether the feature is at the desired location.

17 Claims, 5 Drawing Sheets

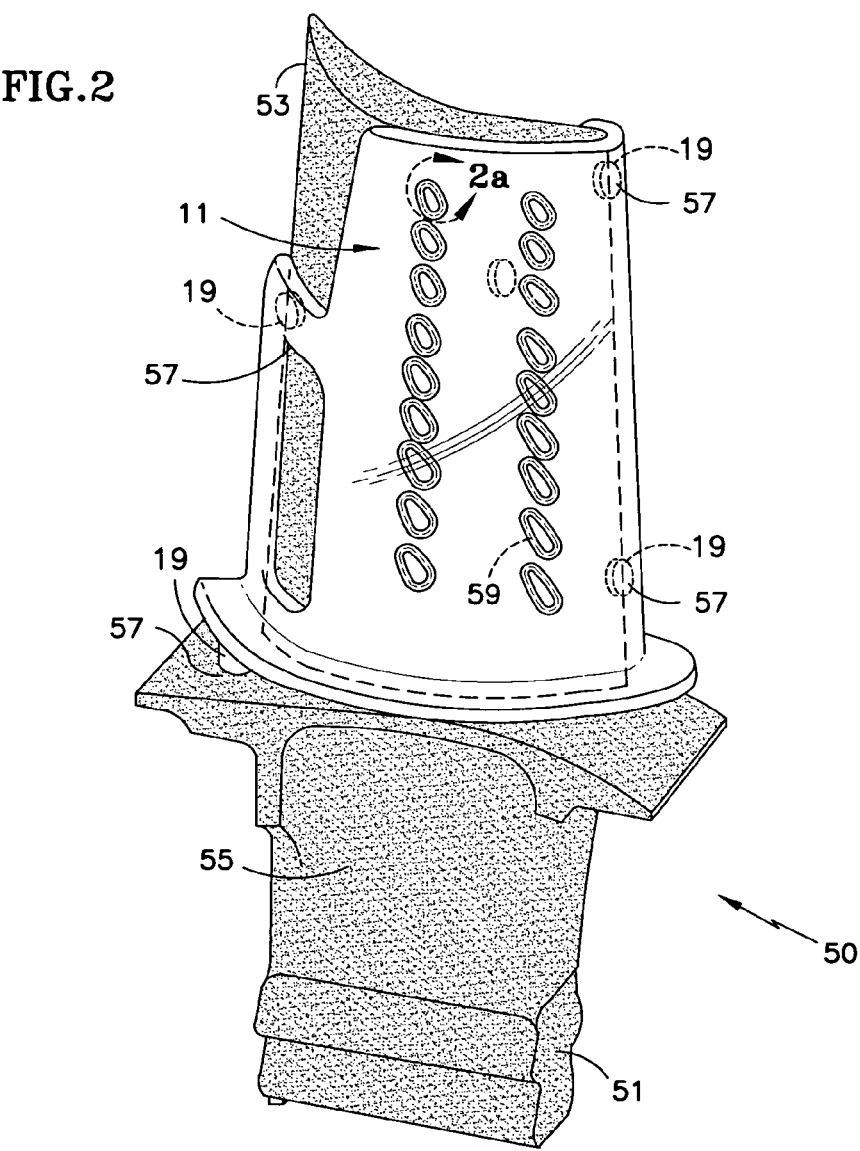
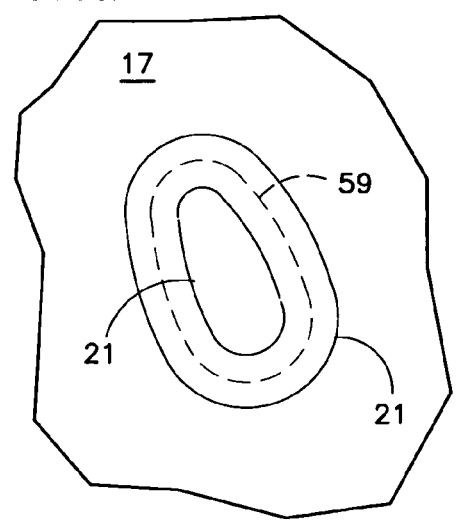

TEMPLATE FOR EVALUATING PARTS AND METHOD OF USING SAME

CROSS-REFERENCE TO RELATED APPLICATIONS

This application claims priority to U.S. Provisional Patent Application No. 60/558,650 filed on Apr. 1, 2004, herein incorporated by reference.

BACKGROUND OF THE INVENTION

This invention relates to templates used for evaluating parts. Specifically, the present invention relates to templates for gross error evaluation of a manufactured product.

BRIEF SUMMARY OF THE INVENTION

It is one object of the present invention to provide an improved template.

This and other objects of the present invention are achieved in one aspect by a template for evaluating a part, comprising: a surface having a shape corresponding to the part; and at least one element on the surface corresponding to a desired location of a feature on the part. The element assists a user to determine whether the feature is at said desired location.

This and other objects of the present invention are achieved in another aspect by a method of evaluating a part, comprising the steps of: providing a template having a shape corresponding to the part and at least one element thereon corresponding to a desired location of a feature on the part; associating the template with the part; and using the element to determine whether the feature is at the desired location.

BRIEF DESCRIPTION OF THE DRAWINGS

Other uses and advantages of the present invention will become apparent to those skilled in the art upon reference to the specification and the drawings, in which:

FIG. 2 is a perspective view of the template of FIG. 1 mounted on a product to be evaluated;

FIG. 2a is a detailed view of the template and product of FIG. 2;

DETAILED DESCRIPTION OF THE INVENTION

Figure 1:
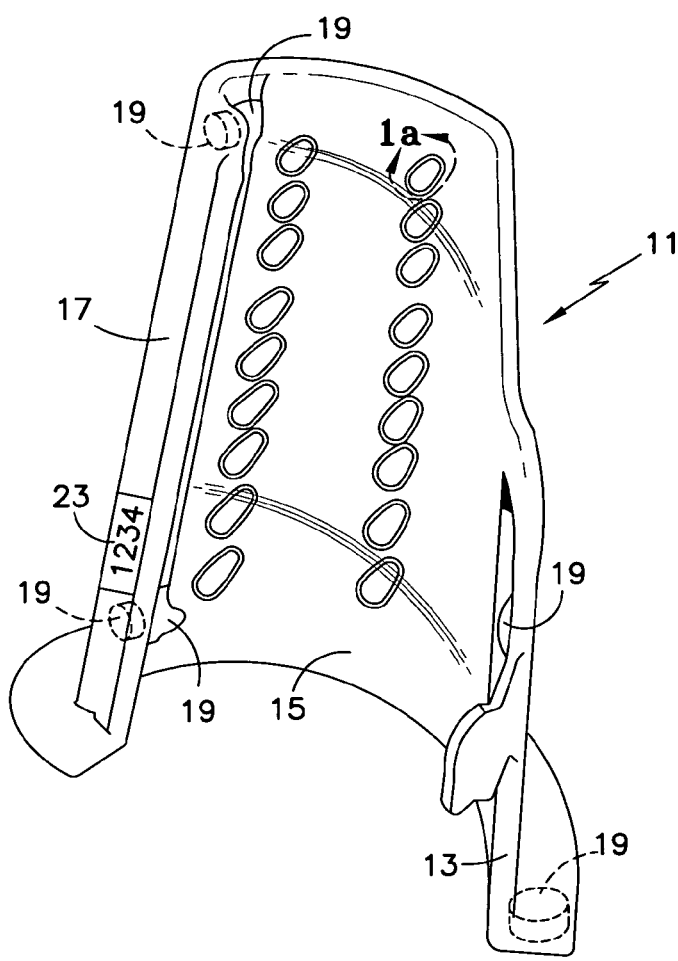
FIG. 1 is a perspective view of the one possible embodiment of the present invention.

FIGS. 1, 1a, 2 and 2a display one possible embodiment of the present invention. The figures display a template 11 manufactured, for example, using stereo lithography (SLA) from a suitable material such as an extra clear resin. The template 11 has a body 13 that generally corresponds to the shape of the object targeted for gross error evaluation. The shape of the body 13 could be determined from a solid model computer file of the object targeted for gross error evaluation.

The body 13 has an interior surface 15 that faces the object and an exterior surface 17 that faces away from the object. The interior surface 15 includes a plurality of protuberances 19. The protuberances 19 contact the object, and keep the remainder of the body 13 offset from the surface of the object. The protuberances 19 preferably have a height that accommodates variation in object size without the remainder of the body 13 contacting the object. The location of the protuberances 19 could conform to a point system used during the manufacturing process. Preferably, the body 13 has six protuberances 19 since the point system used during the manufacturing process identifies six points on the object.

Figure 1A:
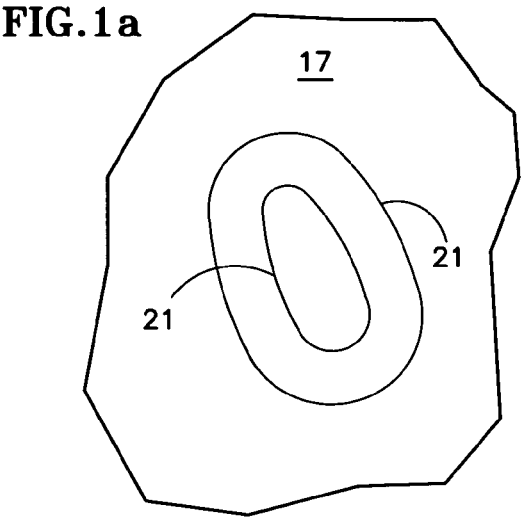
FIG. 1a is a detailed view of the template of FIG. 1.

FIG. 1a is a detailed view of the exterior surface 17 of the body 13. The exterior surface 17 preferably has one or more scribe lines 21 thereon. If formed during an SLA process, the scribe lines 21 could be grooves that extend a distance into the exterior surface 17 of the body 13. The present invention could utilize other suitable techniques to form the scribe lines 21. For example, the scribe lines 21 could be printed indicia. In other words, the scribe lines are printed onto the exterior surface 17 of the body 13.

The scribe lines 21 allow the user to evaluate the object, specifically a feature of the object, for gross errors. Accordingly, the scribe lines 21 are positioned on the exterior surface 17 so as to correspond to the location of such feature on the object. As shown in FIG. 1a, the template could have two scribe lines 21 per feature. One scribe line 21 could identify a minimum of a tolerance range for the location of the feature on the object. The other scribe line 21 could identify a maximum of a tolerance range for the location of the feature on the object The template 11 could also include printed indicia 23 to identify the object targeted for gross error evaluation. For example, the printed indicia 23 could be the part number of the object targeted for gross error evaluation. Other manners of identifying the object targeted for gross error evaluation, however, could be used.

FIGS. 2 and 2a display one possible application of the template 11. The object targeted for gross error evaluation in the figure is a blade 50 of a gas turbine engine (not shown). The blade 50 includes a root section 51 for securing to a disc, an airfoil section 53 for converting the velocity of the fluid exiting the combustion section (not shown) of the engine into rotation of the disc, and a medial section 55 between the root section 51 and airfoil section 53. The manufacturing process for the blade 50 identifies points 57 thereon. Preferably, the manufacturing process identifies six points 57 on the blade 50.

Due to the exposure of the airfoil section 53 to the high temperature fluid exiting the combustion section of the engine, the airfoil section 53 can have apertures 59 in communication with a hollow interior (not shown). Cooling air (not shown) provided to the hollow interior exits the apertures 59 to provide film cooling to the blade 50.

The template 11 allows the user to ensure, after the manufacture of the blade 50, that: (1) the apertures 59 exist on the suction side of the airfoil section 53 of the blade 50; and/or (2) the apertures 59 are properly located (i.e. within the tolerance range of the location of the feature on the object) on the suction side of the airfoil section 53 of the blade 50. As seen in FIG. 2, the blade 50 receives the template 11. The protuberances 19 engage the blade 50 at the points 57 identified during the manufacturing process.

Once associated with the blade 50, the user can view through the template 11 to evaluate the blade 50. FIG. 2a displays a view through the template 11 with a properly located cooling hole 59 (the cooling hole 59 has been shown in phantom line to avoid confusion as the cooling hole 59 resides behind the clear template 11). As discussed above, the protuberances 19 keep the remainder of the body 13 of the template 11 away from the surface of the blade 50. The distance between the body 13 and the blade 50 is kept to a minimum to avoid parallax error.

Figure 3:
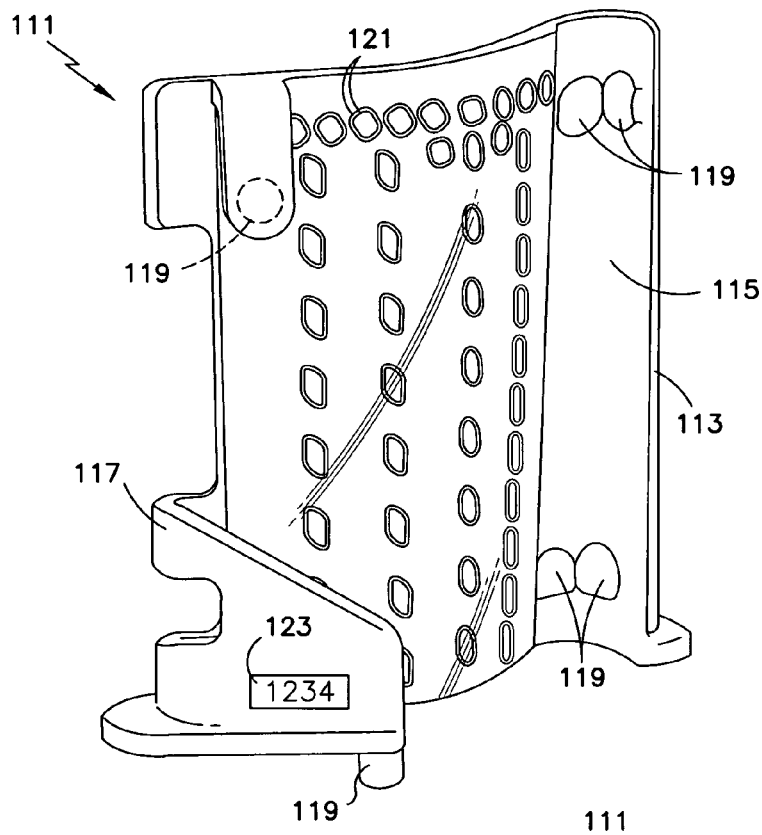
FIG. 3 is a perspective view of another possible embodiment of the present invention.

FIG. 3 displays another possible embodiment of the present invention. The figure displays a template 111. The template 111 is preferably used to evaluate a different section of the object targeted for gross error evaluation. Save for a change in the hundreds digit, the reference characters identifying features of template 111 correspond to the reference characters identifying the same features of template 111.

Briefly, template 111 has a body 113 manufactured, for example, using stereo lithography (SLA) from a suitable material such as an extra clear resin. The body 113 generally corresponds to the shape of the object targeted for gross error evaluation. The body 113 has an interior surface 115 that faces the object and an exterior surface 117 that faces away from the object. The interior surface 15 includes a plurality of protuberances 119. The protuberances 119 contact the object, and keep the remainder of the body 113 offset from the surface of the object. The protuberances 119 conform to a point system used during the manufacturing process. Preferably, the template 111 has six protuberances 119.

The exterior surface 117 of the body 113 preferably has one or more scribe lines 121 thereon. If formed during an SLA process, the scribe lines 121 could be grooves that extend a distance into the exterior surface 117 of the body 113. The present invention could utilize other suitable techniques to form the scribe lines 121. For example, the scribe lines 121 could be printed indicia. In other words, the scribe lines are printed onto the exterior surface 117 of the body 113.

The scribe lines 121 allow the user to evaluate the object, specifically a feature of the object, for gross errors. Accordingly, the scribe lines 121 are positioned on the exterior surface 117 so as to correspond to the location of such feature on the object. Preferably, the template 111 has two scribe lines 121 per feature. One scribe line 121 could identify a minimum of a tolerance range for the location of the feature on the object. The other scribe line 121 could identify a maximum of a tolerance range for the location of the feature on the object.

The template 111 could also include printed indicia 123 to identify the object targeted for gross error evaluation. For example, the printed indicia 123 could be the part number of the object targeted for gross error evaluation. Other manners of identifying the object targeted for gross error evaluation, however, could be used.

Figure 4:
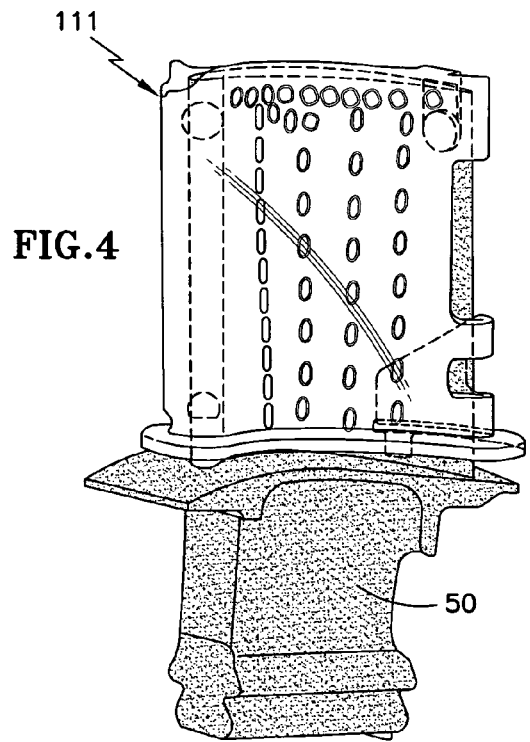
FIG. 4 is a perspective view of the template of FIG. 3 mounted on a product to be evaluated.

FIG. 4 displays the template 111 mounted on the blade 50. The template 111 allows the user to ensure, after the manufacture of the blade 50, that: (1) the apertures 59 exist on the pressure side of the airfoil section 53 of the blade 50; and/or (2) the apertures 59 are properly located (i.e. within the tolerance range of the location of the feature on the object) on the pressure side of the airfoil section 53 of the blade 50. The protuberances 119 engage the blade 50 at the points 57 identified during the manufacturing process. Comparing FIGS. 2 and 4 (note the figures show different sides of the blade), it is clear that the protuberances 119 contact the same points on the blade 50 as the protuberances 19 when using the template 11.

Figure 5:
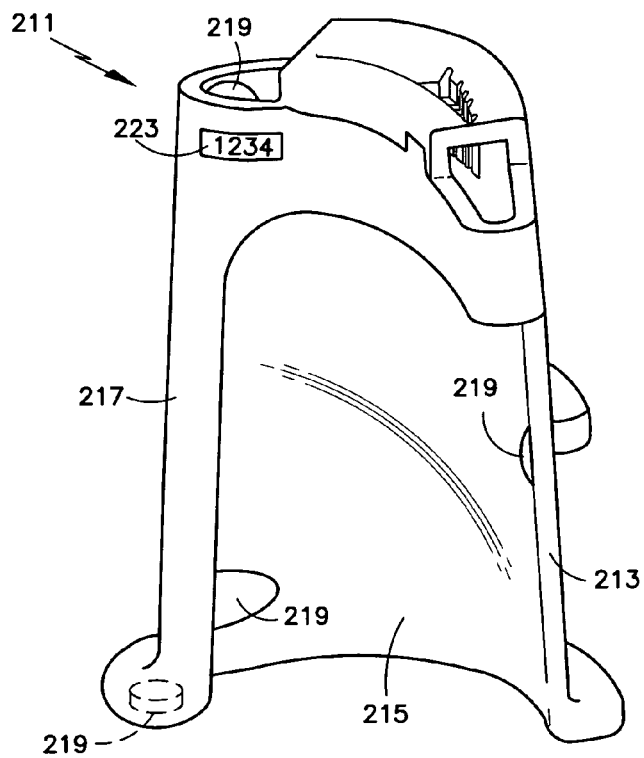
FIG. 5 is a perspective view of another possible embodiment of the present invention.
Figure 7:
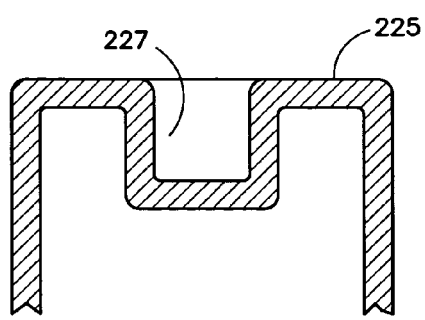
FIG. 7 is a cross-sectional view of the template of FIG. 5, taken along line 7—7.
Figure 6:
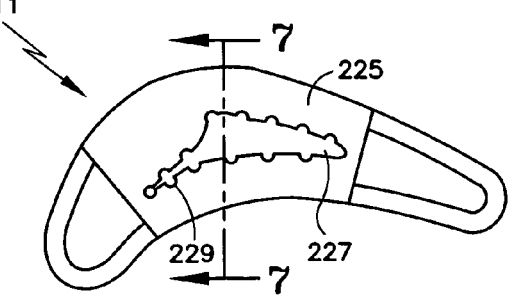
FIG. 6 is a plan view of the template of FIG. 5.

FIGS. 5–7 display another possible embodiment of the present invention. The figures display a template 211. The template 211 is preferably used to evaluate a different section of the object targeted for gross error evaluation than templates 11, 111. The template 211 has features corresponding to the features of templates 11, 111. These features used the same reference character, save a change in the hundreds digit. Template 201 does have features different that those described with templates 11, 111. The features will have different reference characters.

Briefly, template 211 has a body 213 manufactured, for example, using stereo lithography (SLA) from a suitable material such as an extra clear resin. The body 213 generally corresponds to the shape of the object targeted for gross error evaluation. The body 213 has an interior surface 215 that faces the object and an exterior surface 217 that faces away from the object. The interior surface 215 includes a plurality of protuberances 219. The protuberances 219 conform to a point system used during the manufacturing process.

The template 211 could also include printed indicia 223 to identify the object targeted for gross error evaluation. For example, the printed indicia 223 could be the part number of the object targeted for gross error evaluation. Other manners of identifying the object targeted for gross error evaluation, however, could be used.

Due to the location of the feature on the object, the template 211 also includes a section 225 having a depressed area 227. The depressed area 227 has scallops 229 therein. The scallops 229 allow the user to evaluate the object, specifically features of the object, for gross errors. Accordingly, the scallops 229 are positioned on the depressed area 227 of the section 225 so as to correspond to the location of such features on the object.

Figure 8:
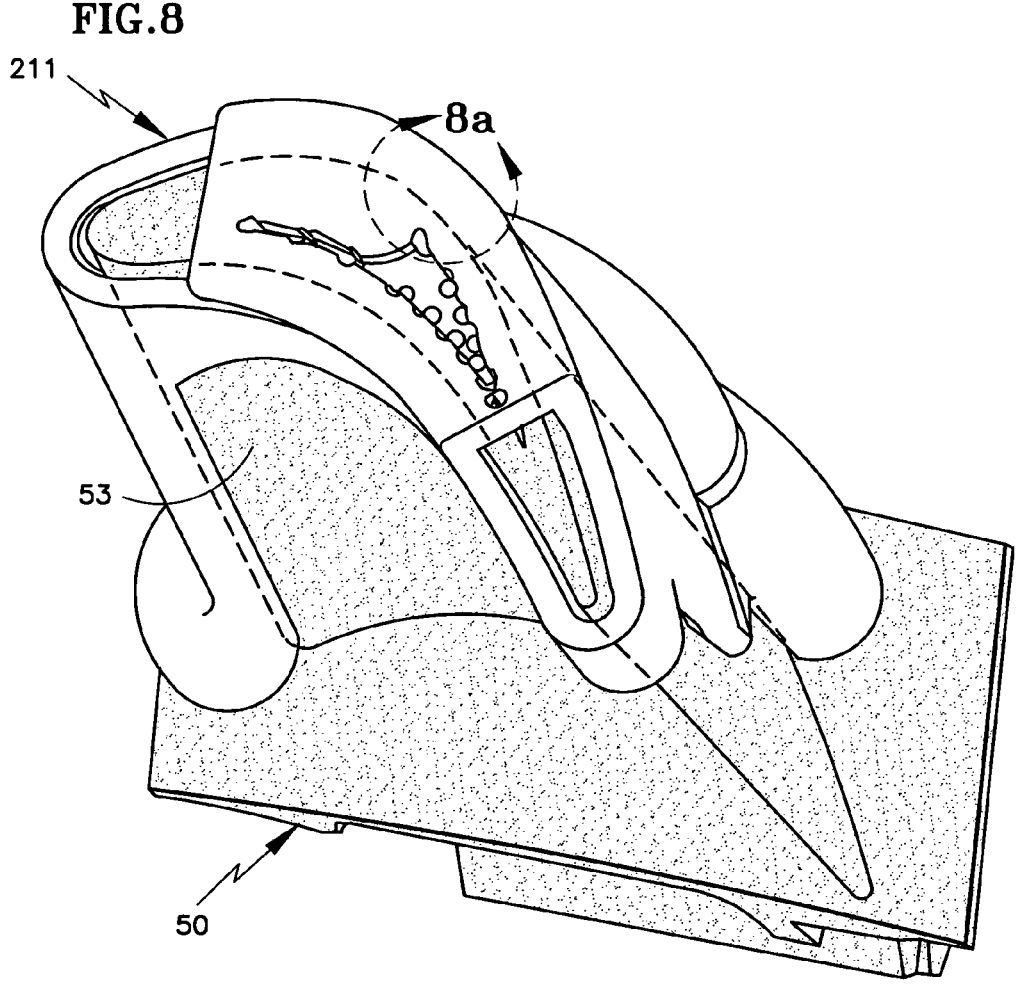
FIG. 8 is a perspective view of the template of FIG. 5 mounted on a product to be evaluated.
Figure 8A:
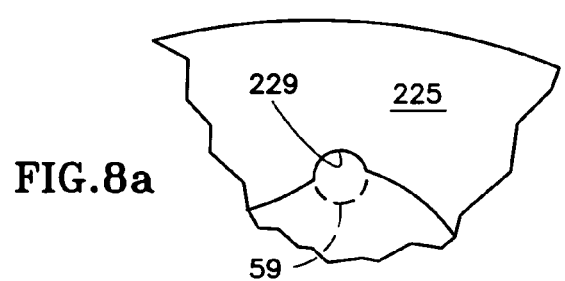
FIG. 8a is a detailed view of the template and product of FIG. 8.

FIG. 8 displays the template 211 mounted on the blade 50. The template 211 allows the user to ensure, after the manufacture of the blade 50, that: (1) the apertures 59 exist on the radial tip of the airfoil section 53 of the blade 50; and/or (2) the apertures 59 are properly located (i.e. within the tolerance range of the location of the feature on the object) on the radial tip of the airfoil section 53 of the blade 50. FIG. 8a shows The protuberances 119 engage the blade 50 at the points 57 identified during the manufacturing process. Comparing FIGS. 2 and 4 (note the figures show different sides of the blade), it is clear that the protuberances 119 contact the same points on the blade 50 as the protuberances 19 when using the template 11.

FIG. 8a displays a view through the template 211 with a properly located cooling hole 59 (the cooling hole 59 has been shown in phantom line to avoid confusion as the cooling hole 59 resides behind the clear template 211). Preferably, the template 211 has five protuberances 219. The depressed area 227 serves as the sixth contact point with the blade 50. In the embodiment shown in FIGS. 5–7, the location where depressed area 227 contacts blade 50 does not correspond to the sixth point location used with templates 11, 111. Nevertheless, the protuberances 219 and the depressed area 227 contact the object, and keep the remainder of the body 213 offset from the surface of the object.

The present invention has been described in connection with the preferred embodiments of the various figures. It is to be understood that other similar embodiments may be used or modifications and additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A template for evaluating gas turbine airfoil, comprising:
   an interior surface having a shape corresponding to the airfoil;
   an exterior surface; and
   at least one element on said external surface corresponding to a desired location of a feature on said part;
   wherein said at least one element comprises at least one scribe line to assists a user to determine whether said feature is at said desired location.

2. The template of claim 1, further comprising at least one protuberance to contact said airfoil; wherein said at least one protuberance is integrally formed with said interior surface.

3. The template of claim 2, wherein said template has at least five protuberances.

4. The template of claim 3, wherein said template has six protuberances.

5. The template of claim 1, wherein said element comprises printed indicia.

6. The template of claim 1, wherein said template further comprises a depressed area; and wherein said depressed area comprises an element that is scallop shaped.

7. A method of evaluating gas turbine airfoil, comprising the steps of:
   providing a template having a shape corresponding to said airfoil and at least one scribe line element thereon corresponding to a desired location of a feature on said airfoil;
   associating said template with said airfoil; and
   using said at least one scribe line element to determine whether said feature is at said desired location.

8. The method of claim 7, wherein said associating step comprises placing said template against said airfoil.

9. The method of claim 8, wherein said template further comprises at least one integrally formed protuberance to contact said part.

10. The method of claim 9, wherein said template has at least five protuberances.

11. The method of claim 10, wherein said template has six protuberances.

12. The method of claim 7, wherein said determining step includes a step of viewing through said template.

13. The method of claim 7, wherein said element comprises printed indicia.

14. The method of claim 7, wherein said template comprises a depressed area; and
   wherein said depressed area comprises an element that is scallop shaped.

15. The template of claim 1 wherein said at least one element is noncircular.

16. The template of claim 15 wherein said at least one element comprises a first scribe line corresponding to a minimum tolerance of the desired location of the feature and a second scribe line corresponding in a maximum tolerance of the desired location of the feature.

17. The template of claim 1 wherein said template is made of resin using a sterolithography apparatus.

* * * * *